United States Patent
Suetake et al.

[11] Patent Number: 5,911,291
[45] Date of Patent: Jun. 15, 1999

[54] ELECTROMAGNETIC CLUTCH

[75] Inventors: Kazuyuki Suetake; Kazunori Kobayashi, both of Saitama, Japan

[73] Assignee: Honda Giken Kogyo Kabushiki Kaisha, Tokyo, Japan

[21] Appl. No.: 09/006,165

[22] Filed: Jan. 13, 1998

[30]  Foreign Application Priority Data

Jan. 14, 1997   [JP]   Japan .................................. 9-004863

[51] Int. Cl.⁶ ................................................ F16D 27/115
[52] U.S. Cl. ........................ 192/35; 192/84.7; 192/84.91
[58] Field of Search .......................... 192/35, 84.7, 84.9, 192/84.91, 84.93, 84.96; 74/650; 335/281, 296, 297

[56]  References Cited

U.S. PATENT DOCUMENTS

| | | | |
|---|---|---|---|
| 2,937,729 | 5/1960 | Sperr, Jr. ................................. | 192/84.7 |
| 4,718,303 | 1/1988 | Fogelberg ............................ | 192/84.7 X |
| 5,078,248 | 1/1992 | Yesnik .................................. | 192/84.7 X |
| 5,620,072 | 4/1997 | Engle ........................................ | 192/35 |

Primary Examiner—Richard M. Lorence
Attorney, Agent, or Firm—Armstrong, Westerman, Hattori, McLeland & Naughton

[57]  ABSTRACT

A solenoid of an electromagnetic clutch includes an annular coil, an annular coil housing which covers a radially facing outer peripheral surface, a radially facing inner peripheral surface and an axially facing end face of the coil. An armature is adapted to be attracted to the one end face of the coil housing by supplying an electric current to the coil. The housing axially protrudes past the other axially facing end face of the coil by a distance L. Thus, the magnetic resistance around the outer periphery of the coil is decreased to enhance the magnetic flux density of the magnetic closed circuit, thereby enabling the reliable attraction of the armature without increasing the electric power consumed by the coil.

3 Claims, 10 Drawing Sheets

ELECTROMAGNETIC CLUTCH

BACKGROUND OF THE INVENTION

1. Field of the Invention

The present invention relates to an electromagnetic clutch constructed so that friction-engaging elements are brought into close contact with one another by the attracting force of a solenoid.

2. Description of the Related Art

The solenoid of an electromagnetic clutch may include a coil housing which is disposed at a predetermined distance around an outer periphery of a coil having a conductor wire wound around an iron core, so that an armature is attracted to the coil housing by a magnetic force generated by supplying an electric current to the coil to bring the friction engaging elements into engagement with one another.

To reliably attract the armature, while minimizing the electric power consumed by the solenoid, it is necessary to decrease the magnetic resistance of a magnetic closed circuit formed around the outer periphery of the coil and to keep the leakage of a magnetic flux from the magnetic closed circuit to a minimum.

SUMMARY OF THE INVENTION

Accordingly, it is an object of the present invention to enhance the magnetic flux density of the magnetic closed circuit formed by electric current supplied to the coil of the electromagnetic clutch to enable a reliable attraction of the armature.

To achieve the above object, according to a first aspect and feature of the present invention, there is provided an electromagnetic clutch comprising an input member carried on a clutch input shaft, an output member carried on a clutch output shaft, a plurality of friction-engaging elements disposed between the input member and the output member, a clutch piston adapted to bring the friction-engaging elements into close contact with one another to integrally couple the input and output members to each other, a solenoid for generating an attracting force by supplying an electric current, and a cam mechanism adapted to boost the attracting force of the solenoid to drive the clutch piston, the solenoid being comprised of an annular coil, an annular coil housing which covers a radially facing outer peripheral surface, a radially facing inner peripheral surface and an axially facing end face of the coil, and an armature adapted to be attracted to the end face of the coil covered by the housing by supplying the electric current to the coil. The annular housing protrudes past a second axially facing end face of the coil.

If the electric current is supplied to the coil of the solenoid, the armature is attracted to the coil housing to operate the cam mechanism, and the friction-engaging members are brought into close contact with one another by the clutch piston driven by the cam mechanism to integrally couple the input and output members to each other, thereby permitting a driving force from the clutch input shaft to be transmitted to the clutch output shaft. At this time, because the coil housing protrudes axially past the end of the coil, the magnetic resistance around the outer peripheral portion of the coil is decreased to enhance the magnetic flux density of the magnetic closed circuit, thereby enabling the reliable attraction of the armature without increasing the electric power consumed by the coil.

According to a second aspect and feature of the present invention, in addition to the first feature, the cam mechanism disposed between the clutch output shaft and the solenoid has gaps ($\beta$ and $\gamma$) between the cam mechanism and the clutch output shaft and/or the solenoid.

With the second feature of the present invention, the amount of magnetic flux leaked from the magnetic closed circuit formed around the outer periphery of the coil of the solenoid through the cam mechanism to the clutch output shaft is decreased by the gaps defined between the cam mechanism and the clutch output shaft and/or the cam mechanism and the solenoid. Therefore, a reduction in attracting force to the armature is avoided.

According to a third aspect and feature of the present invention, in addition to the first feature, each of a core of the coil, the coil housing and the armature is formed from a material having a high relative magnetic permeability, for example, iron.

With the third feature of the present invention, the magnetic closed circuit formed around the outer periphery of the coil of the solenoid is shielded in magnetism by the core of the coil, the coil housing and the armature each of which is formed from a material having a high relative magnetic permeability, thereby decreasing the leakage of the magnetic flux. Therefore, a reduction in attracting force to the armature is avoided. The term "material having a high relative magnetic permeability" means a material having a large ratio of the magnetic flux density to the magnetic field (magnetic flux density/magnetic field), such as silicon, permalloy, and iron.

The above and other objects, features and advantages of the present invention will become apparent from the following description of the preferred embodiment taken in conjunction with the accompanying drawings.

BRIEF DESCRIPTION OF THE DRAWINGS

FIGS. 1 to 10 illustrate an embodiment of the present invention, wherein FIG. 1 is an illustration of the entire arrangement of a four-wheel drive vehicle;

FIG. 2 is a plan view of the entire rear differential;

FIG. 3 is an enlarged view of a portion of the rear differential shown in FIG. 2;

FIG. 4 is an enlarged view of a portion of the rear differential shown in FIG. 2;

FIG. 5 is an enlarged view of a portion of the rear differential shown in FIG. 2;

FIG. 6 is an enlarged sectional view taken along a line 6—6 in FIG. 4;

FIG. 7 is an enlarged view of a portion shown in FIG. 4;

FIG. 8 is a sectional view taken along a line 8—8 in FIG. 3;

FIG. 9 is a sectional view taken along a line 9—9 in FIG. 8; and FIG. 10 is a graph illustrating the relationship between the vehicle speed and the maximum transmitted torque of a clutch.

DETAILED DESCRIPTION OF THE PREFERRED EMBODIMENTS

The present invention will now be described by way of particular embodiments with reference to the accompanying drawings.

Figure 1:
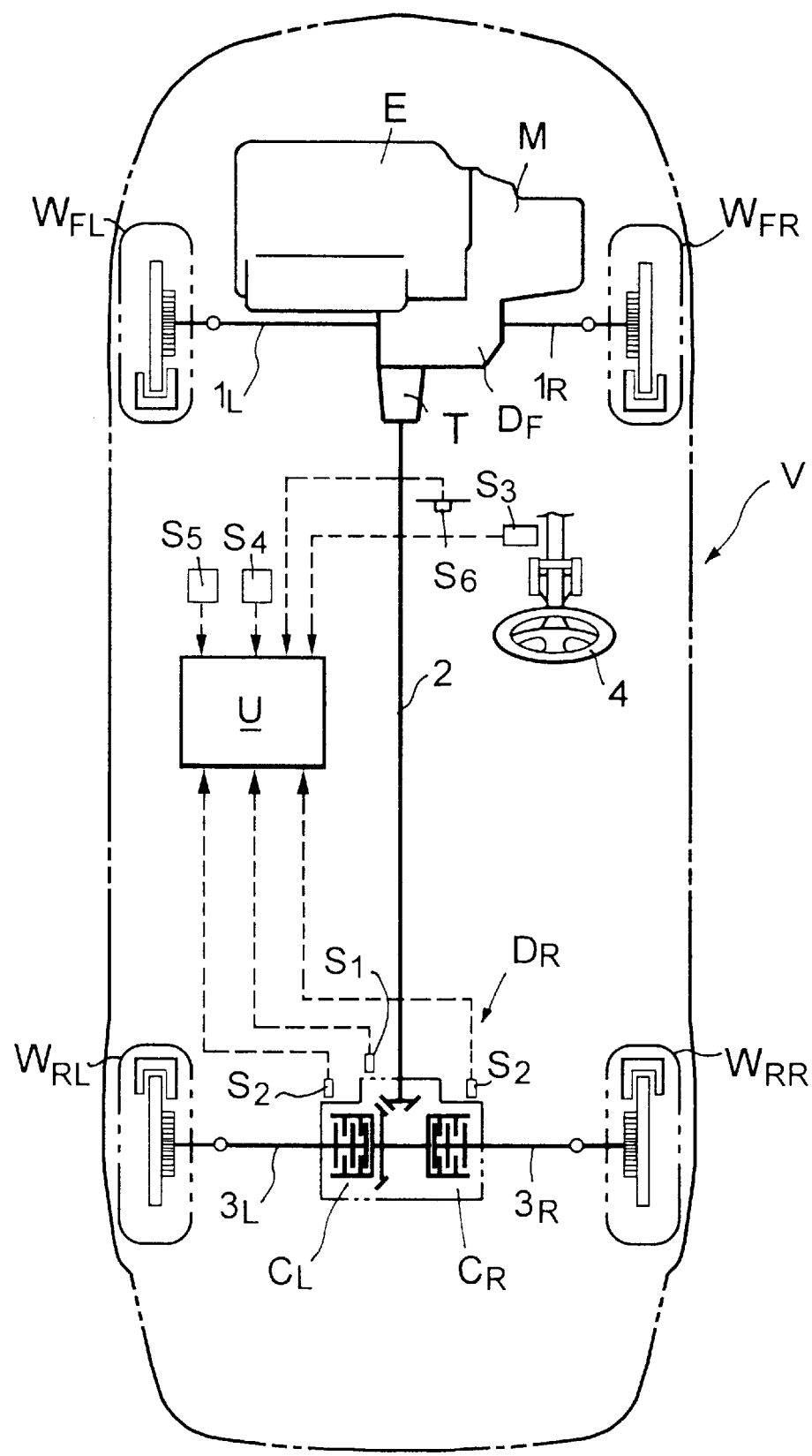
Figure 2:
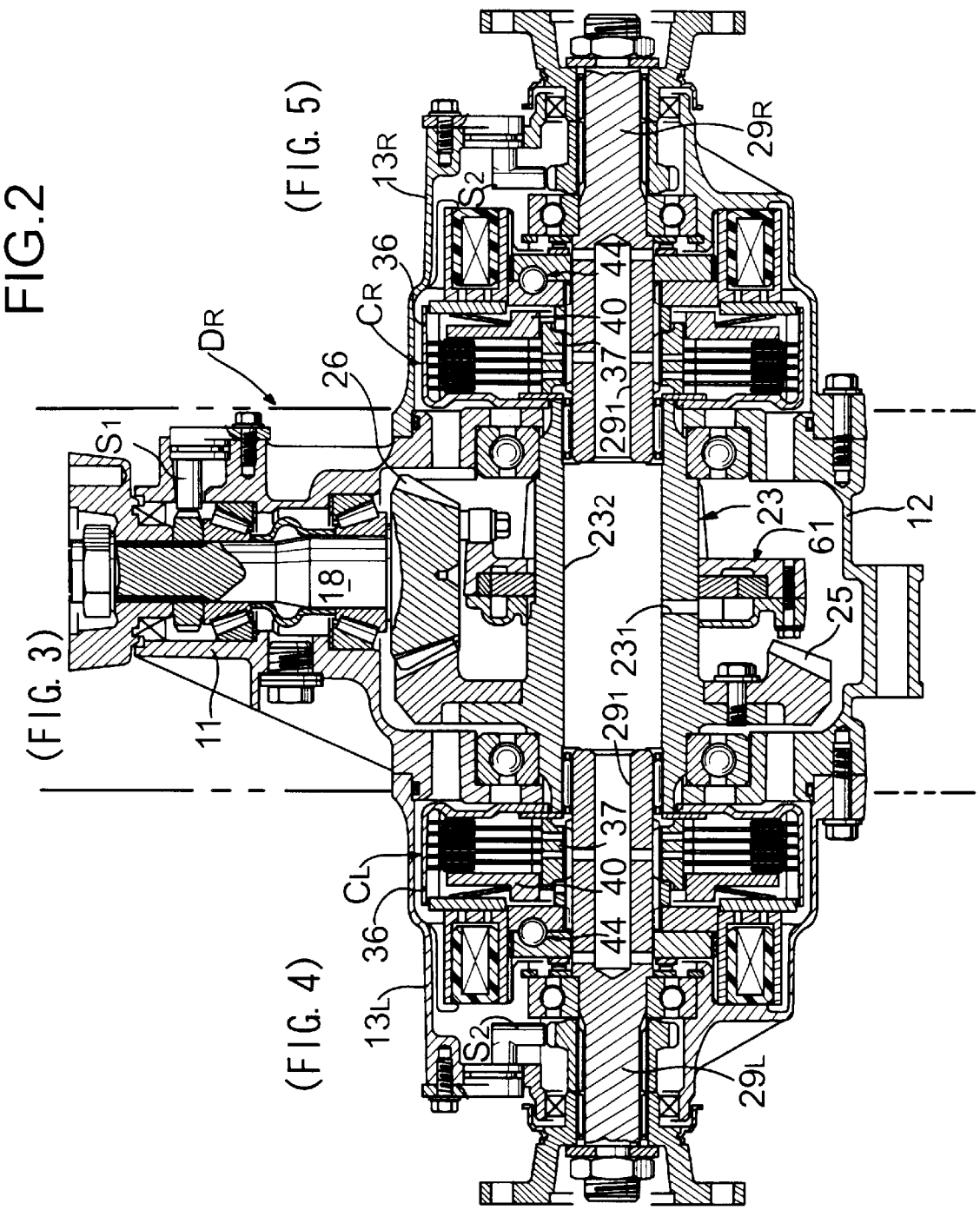
Figure 3:
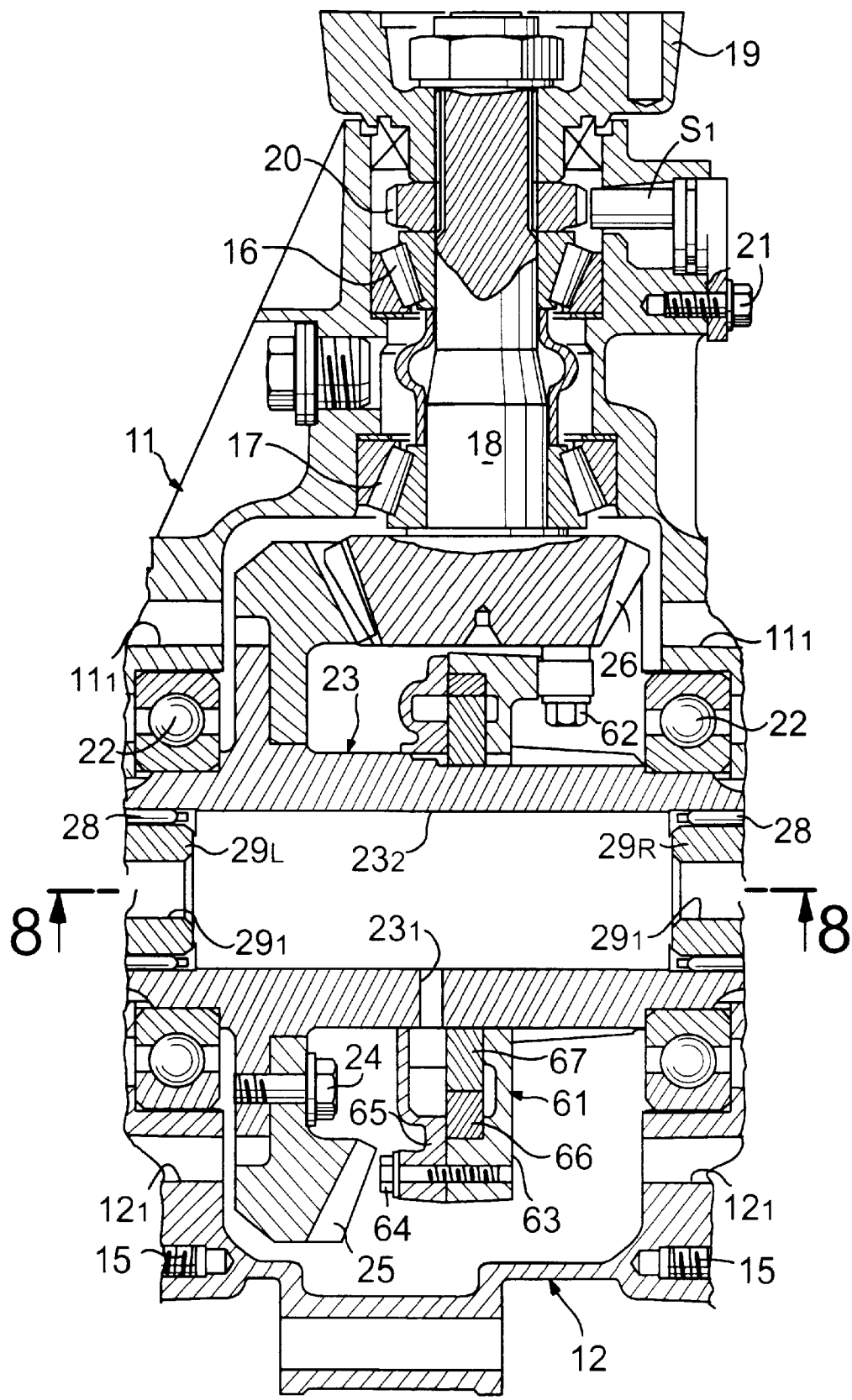

Referring to FIG. 1, a four-wheel drive vehicle V includes an engine E horizontally mounted in a front portion of a vehicle body, a transmission M provided integrally with the engine E, a front differential $D_F$ which connects the transmission M to drive shafts $1_L$ and $1_R$ of left and right front wheels $W_{FL}$ and $W_{FR}$, a transfer means T which connects the front differential $D_F$ to a propeller shaft 2, and a rear differential $D_R$ which connects the propeller shaft 2 to drive shafts $3_L$ and $3_R$ of left and right rear wheels $W_{RL}$ and $W_{RR}$. The rear differential $D_R$ is capable of controlling the transmitting of a driving force to the drive shafts $3_L$ and $3_R$ of the rear wheels $W_{RL}$ and $W_{RR}$. When the transmission of the driving force is cut off, the vehicle is brought into a front wheel drive state in which only the front wheels $W_{FL}$ and $W_{FR}$ are driven. The vehicle is brought into a four-wheel drive state when both of the front wheels $W_{FL}$ and $W_{FR}$ and the rear wheels $W_{RL}$ and $W_{RR}$ are driven. Further, in the four-wheel drive state, the rear differential $D_R$ is capable of controlling the distribution of the driving force to the left and right rear wheels $W_{RL}$ and $W_{RR}$ to any extent.

Connected to an electronic control unit U are a front wheel speed sensor $S_1$ for detecting a front wheel speed based on a number of rotations of the propeller shaft 2, a pair of rear wheel speed sensors $S_2$ for detecting rear wheel speeds based on a number of rotations of the left and right drive shafts $3_L$ and $3_R$ of the rear wheels $W_{RL}$ and $W_{RR}$, a steering angle sensor $S_3$ for detecting a steering angle of a steering wheel 4, a yaw rate sensor $S_4$ for detecting a yaw rate of the vehicle body, a lateral acceleration sensor $S_5$ for detecting a lateral acceleration of the vehicle body, and a differential lock switch $S_6$ for locking the rear differential $D_R$. The electronic control unit U controls left and right electromagnetic clutches $C_L$ and $C_R$ (which will be described hereinafter) mounted in the rear differential $D_R$ based on signals from the sensors $S_1$ to $S_5$ and the differential lock switch $S_6$.

The structure of the rear differential $D_R$ will be described with reference to FIGS. 2 to 9. Since the rear differential $D_R$ has a substantially laterally symmetric structure and hence, with regard to the lateral symmetric portions, only the left portion will be described, and a duplicated description for the right portion is omitted.

The rear differential $D_R$ includes a casing means which is divided into a front center casing 11, a rear center casing 12 coupled to a rear surface of the front center casing 11 by a plurality of bolts 14 (see FIG. 9), a left side casing $13_L$ coupled to left sides of the center casings 11 and 12 by a plurality of bolts 15, and a right side casing $13_R$ coupled to right sides of the center casings 11 and 12 by a plurality of bolts 15.

An input shaft 18 is supported in a front casing 11 by a pair of tapered roller bearings 16 and 17, and coupled at its front end to a rear end of the propeller shaft 2 (see FIG. 1) through a coupling 19. Rotor 20 is fixed to the input shaft 18. The front wheel speed sensor $S_1$ is fixed to the front center casing 11 by a bolt 21 and is opposed to the rotor 20 to detect a number of rotations of the input shaft 18. A hollow clutch drive shaft 23 is supported at its opposite ends in the front center casing 11 and the rear center casing 12 through a pair of ball bearings 22, and a driven bevel gear 26 integrally formed at a rear end of the input shaft 18 is meshed with a follower bevel gear 25 fixed to the clutch drive shaft 23 by a bolt 24. The input shaft 18 and the clutch drive shaft 23 are in offset locations and are not on the same plane. Therefore, the follower bevel gear 25 and driven bevel gear 26, which are of a hypoid type, are used.

A left output shaft $29_L$ is supported coaxially with the clutch drive shaft 23 by a ball bearing 27 mounted on the left side casting $13_L$ and a needle bearing 28 mounted at a left end of the clutch drive shaft 23. The left drive shaft $3_L$ (see FIG. 1) is coupled at its right end to a left end of the left output shaft $29_L$ protruding from the left side casing $13_L$ through a coupling 30. The rear wheel speed sensor $S_2$ opposed to a rotor 31 fixed to the left output shaft $29_L$ to detect a number of rotations of the left output shaft $29_L$ is fixed to the left side casing $13_L$ by a bolt 32.

The left electromagnetic clutch $C_L$ accommodated in the left side casing $13_L$ includes a clutch outer 36 spline-coupled to the left end of the clutch drive shaft 23, a clutch inner 37 spline-coupled to a right end of the left output shaft $29_L$, a plurality of clutch disks 38 axially slidably but non-rotatably carried on an inner periphery of the clutch outer 36, a plurality of clutch plates 39 axially slidably but non-rotatably carried on an outer periphery of the clutch inner 37 and alternately positioned between the clutch disks 38 and a clutch piston 40 axially slidably carried on the outer periphery of the clutch inner 37 for bringing the clutch disks 38 and the clutch plates 39 into close contact with each other.

A ball cam mechanism 44 is provided on the outer periphery of the left output shaft $29_L$ and is comprised of a stationary cam member 41, a movable cam member 42 and a plurality of balls 43. A left side of the stationary cam member 41 is opposed to a right side of the ball bearing 27 with a thrust bearing 45 interposed therebetween, and a right side of the movable cam member 42 is opposed to a left side of the clutch inner 37 with a spring 46 interposed therebetween and is opposed to a left side of the clutch piston 40 with a small gap left therebetween. An outer peripheral surface of the stationary cam member 41 is spline-coupled at 48 to an inner peripheral surface of a coil housing 47 which will be described hereinafter, and an inner peripheral surface of the movable cam member 42 is spline-coupled at 49 to an outer peripheral surface of the left output shaft $29_L$.

Figure 6:
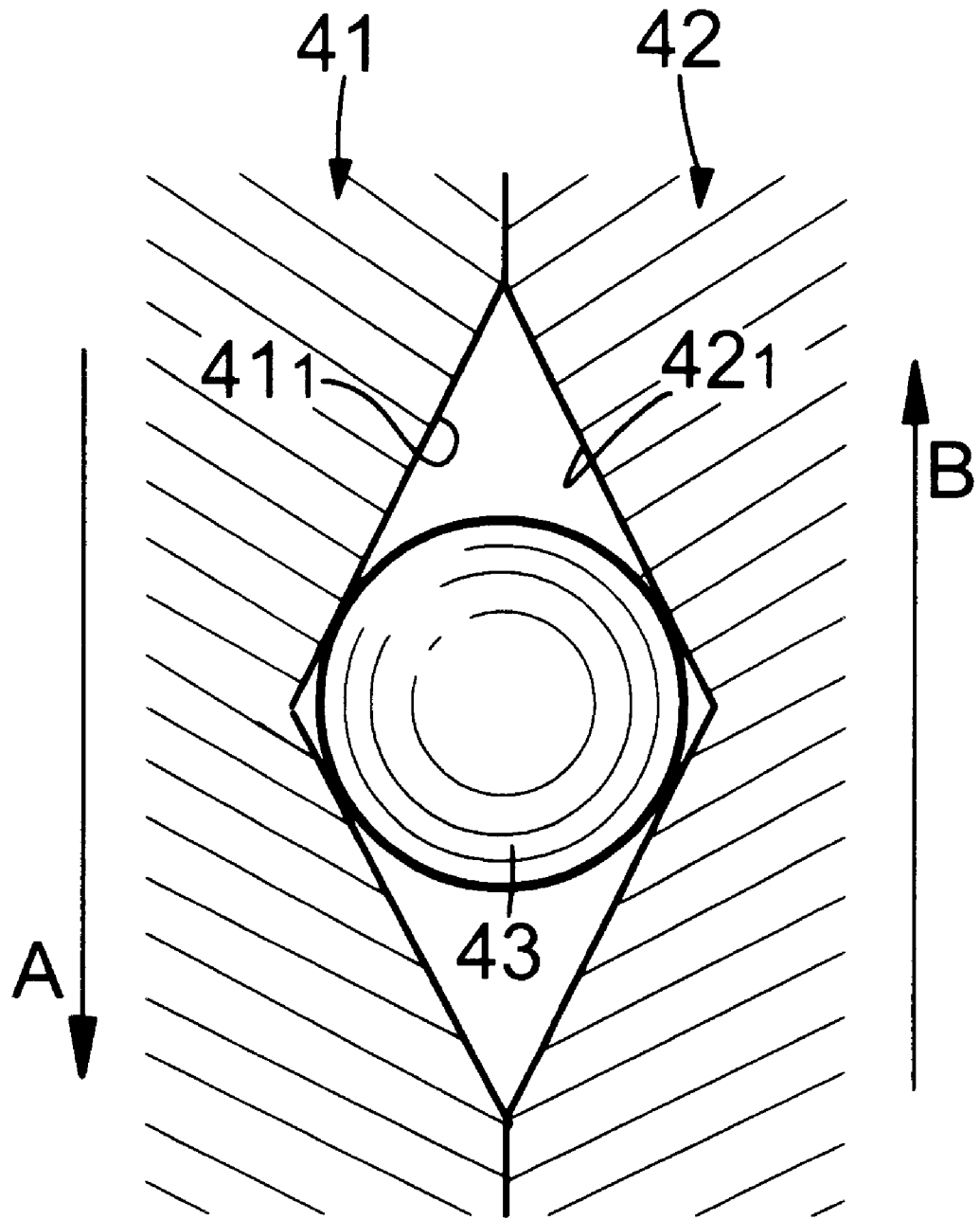

As illustrated by FIG. 6, triangular cam grooves $41_1$ and $42_1$ are defined at predetermined distances in opposed surfaces of the cam members 41 and 42 of the ball cam mechanism 44, and the balls 43 are disposed between the opposed cam grooves $41_1$ and $42_1$.

Figure 7:
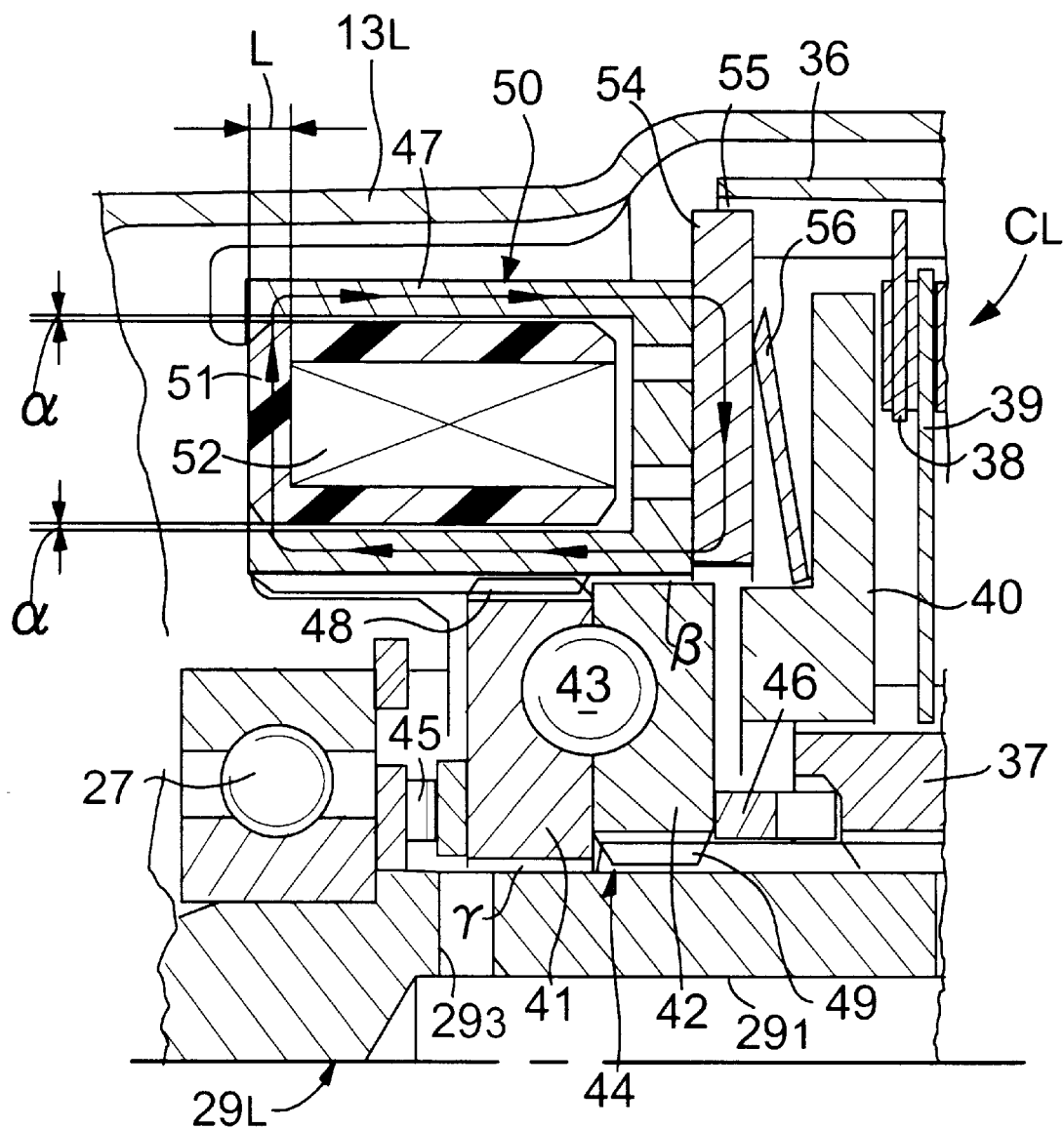

As can be seen from FIG. 7, a solenoid 50 is disposed radially outside the ball cam mechanism 44 and includes an annular coil 52 covered with an insulating material 51, an annular coil housing 47 which covers an inner peripheral surface, an outer peripheral surface and a right side of the coil 52, and an annular armature 54 disposed on a right side of the coil housing 47. The coil 52 is fixed to the left side casing $13_L$ by a means which is not shown, and the coil housing 47 is supported for rotation about the left output shaft $29_L$ through the ball cam mechanism 44. An outer periphery of the armature 54 is spline-coupled at 55 to the clutch outer 36, and a right side of the armature 54 is opposed to the left side of the clutch piston 40 with a coned disc spring 56 interposed therebetween.

A left end (an end opposite from the armature 54) of the coil housing 47 protrudes leftwards by a distance L from a left end of the coil 52, whereby a magnetic closed circuit shown by a bold line is easily formed to enhance the magnetic flux density to increase the attracting force of the armature 54. This is in contrast to the conventional art where the left end of the coil housing 47 is terminated at a location on the right of the left end of the coil 52. Gaps $\alpha$ are defined between the coil 52 fixed to the left side casing $13_L$ and the coil housing 47 which is rotated relative to the coil 52, but by minimizing the size of the gaps $\alpha$, the magnetic flux density can be further enhanced. Further, by forming the coil 52, the coil housing 47 and the armature 54 from a material having a high relative magnetic permeability such as silicon, a permalloy and the like, the magnetic closed circuit can be cut off in magnetism to prevent the magnetic flux from leaking to another member.

A gap $\beta$ is defined between an outer peripheral surface of the movable cam member 42 and the inner peripheral surface of the coil housing 47, and a gap $\gamma$ is defined between an inner peripheral surface of the stationary cam member 41 and the outer peripheral surface of the left output shaft $29_L$. The gap $\beta$ is necessary to allow a relative rotation of the coil housing 47 with respect to the movable cam member 42, and the gap $\gamma$ is necessary to allow a relative rotation of the stationary cam member 41 with respect to the left output shaft $29_L$. By setting the gaps $\beta$ and $\gamma$ to values larger than the values necessary to allow the above relative rotations, however, the amount of magnetic flux leaked from the magnetic closed circuit through the stationary and movable cam members 41 and 42 to the left output shaft $29_L$ can be suppressed to the minimum, thereby increasing the attracting force of the armature 54 and reducing the electric power consumed by the coil 52.

Figure 8:
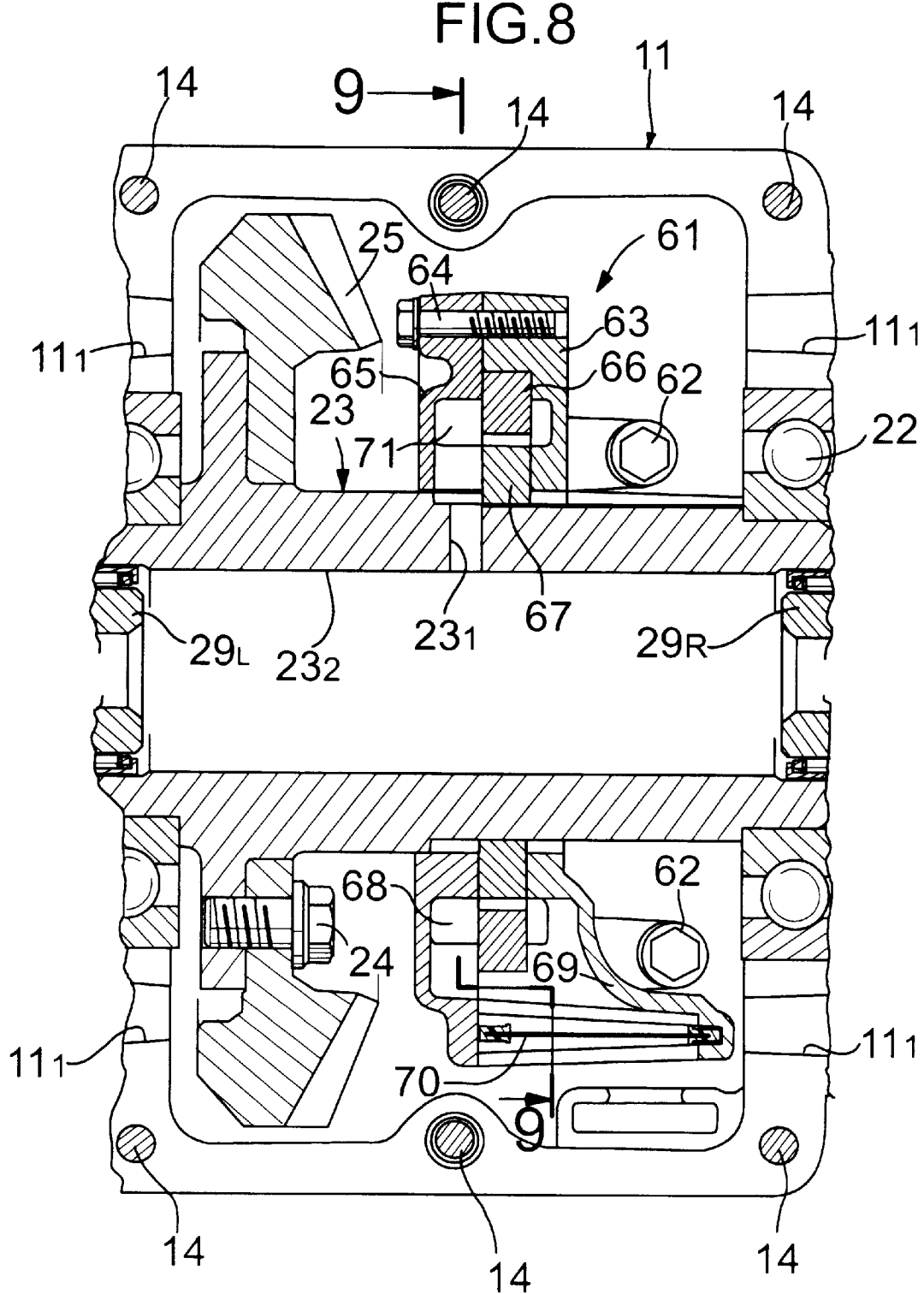
Figure 9:
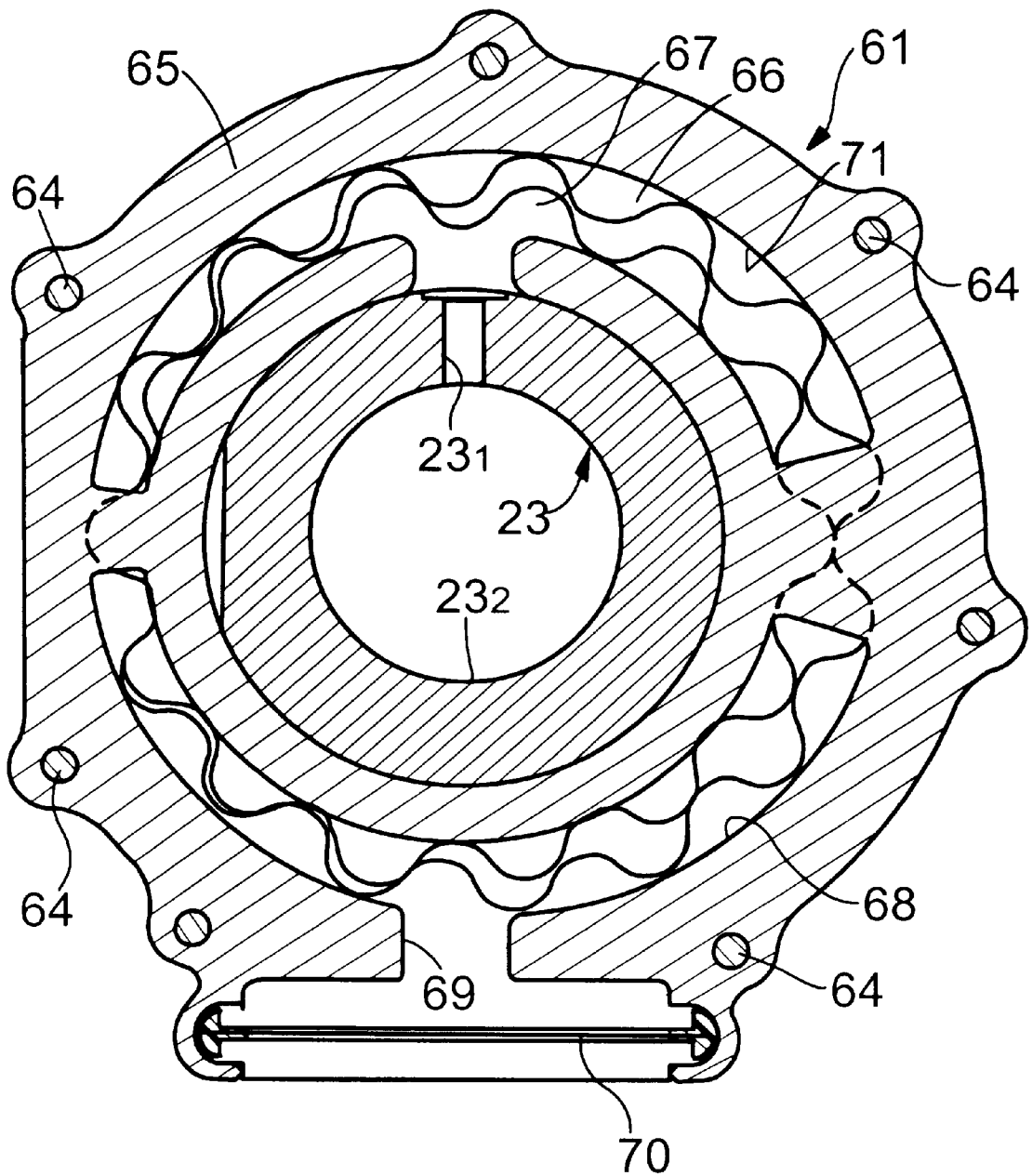

As can be seen by reference to FIGS. 8 and 9, an oil pump 61 accommodated in an internal space in the front center casing 11 and the rear center casing 12 is a trochoid pump and includes a pump housing 63 fixed to an inner surface of the front center casing 11 by bolts 62, a pump cover 65 coupled to the pump housing 63 by bolts 64, an internally toothed outer rotor 66 rotatably accommodated within the pump housing 63 and the pump cover 65, and an externally toothed inner rotor 67 fixed to an outer periphery of the clutch drive shaft 23 and meshed with the outer rotor 66.

A lubricating oil is stored in a space below the front and rear center casings 11 and 12. An oil strainer 70 is mounted in an oil passage 69 extending downwards from an intake port 68 defined below the pump housing 63 and the pump cover 65, and is immersed in the oil. A discharge port 71 is defined above the pump housing 63 and the pump cover 65 to communicate with an oil passage $23_2$ axially defined in the clutch drive shaft 23 through an oil bore $23_1$ radially defined in the clutch drive shaft 23. The internal space in the front and rear center casings 11 and 12 communicates with an internal space in the left and right side casings $13_L$ and $13_R$ through a plurality of through-bores $11_1$ and $12_1$.

A right end of an oil passage $29_1$ axially defined in the left output shaft $29_L$ communicates with a left end of the oil passage $23_2$ axially defined in the clutch drive shaft 23. Oil bores $29_2$ and $29_3$ radially extending from the oil passage $29_1$ are defined in the left output shaft $29_L$. Oil bores $29_2$ face an oil bores $37_1$ defined in the clutch inner 37, and bores $29_3$ face the thrust bearing 45 disposed between the ball bearing 27 and the ball cam mechanism 44.

The operation of the embodiment of the present invention having the above-described construction will be described below.

At the start of the vehicle, a driving force from the engine E is first transmitted to the left and right front wheels $W_{FL}$ and $W_{FR}$ through the transmission M, the front differential $D_F$ and the drive shafts $1_L$ and $1_R$. The driving force from the engine E is also transmitted to the rear differential $D_R$ through the propeller shaft 2 to rotate the input shaft 18, the driven bevel gear 26, the follower bevel gear 25 and the clutch drive shaft 23. However, the left and right electromagnetic clutches $C_L$ and $C_R$ are in their non-engaged states and hence, the rear wheels $W_{RL}$ and $W_{RR}$ are not driven. At this time, the rotational speeds of the front wheels are detected by the front wheel speed sensor $S_1$ mounted on the input shaft 18 of the rear differential $D_R$, and the rotational speeds of the rear wheels are detected by the rear wheel speed sensors $S_2$ and $S_2$ mounted on the left and right output shafts $29_L$ and $29_R$ of the rear differential $D_R$. However, at a moment when the driving force has been transmitted to the front wheels $W_{FL}$ and $W_{FR}$, the driving force is still not transmitted to the rear wheels $W_{RL}$ and $W_{RR}$ due to the fact that the left and right electromagnetic clutches $C_L$ and $C_R$ are in their non-engaged states. Therefore, a differential rotation is produced between the front wheels $W_{FL}$ and $W_{FR}$ and the rear wheels $W_{RL}$ and $W_{RR}$. When the differential rotation between the front wheels $W_{FL}$ and $W_{FR}$ and the rear wheels $W_{RL}$ and $W_{RR}$ is detected, the left and right electromagnetic clutches $C_L$ and $C_R$ are brought into their engaged states based on a signal from the electronic control unit U, thereby permitting the rotation of the clutch drive shaft 23 to be transmitted to the rear wheels $W_{RL}$ and $W_{RR}$ through the left and right output shafts $29_L$ and $29_R$ and the left and right drive shafts $3_L$ and $3_R$. In this manner, the vehicle V is brought into the four-wheel drive state.

Figure 4:
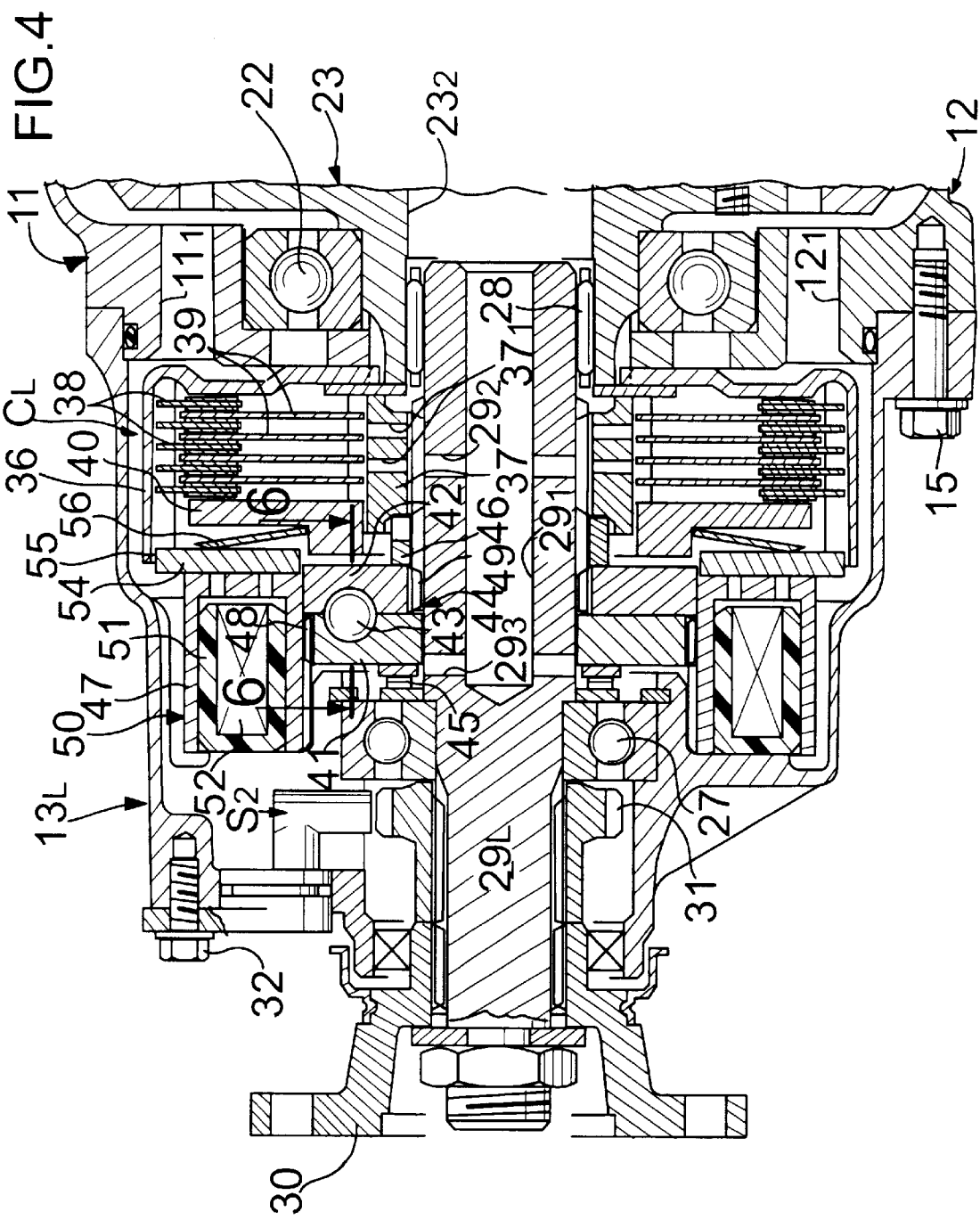
Figure 5:
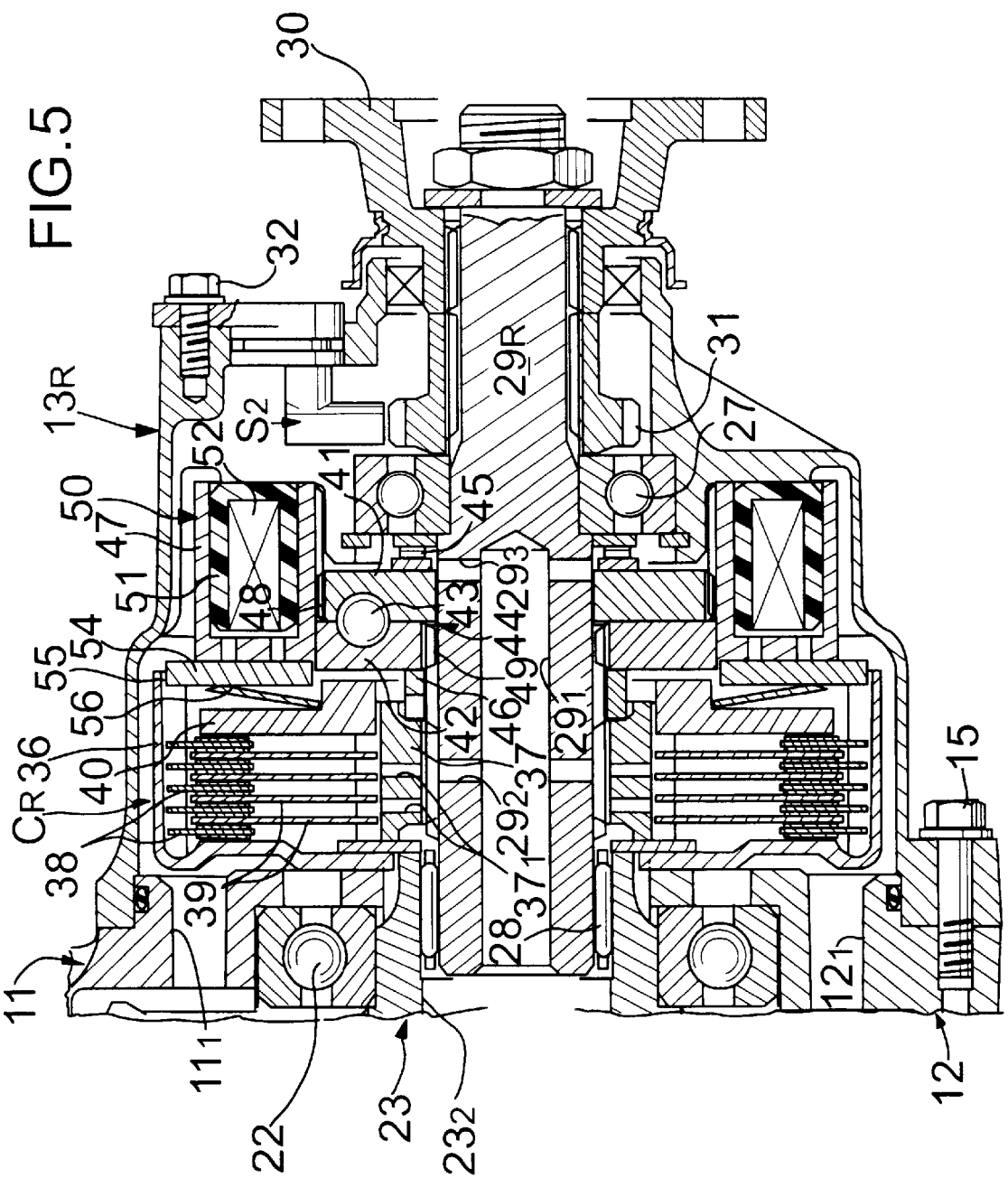

The operation of the electromagnetic clutches $C_L$ and $C_R$ will be described by taking the left electromagnetic clutch $C_L$ shown in FIG. 4 as an example. When the solenoid 50 is in its non-energized state, the attraction of the armature to the coil housing 47 has been released, and hence, the coil housing 47 and the armature 54 are rotatable relative to each other. In this state, the clutch drive shaft 23, the clutch outer 36, the clutch disks 38 and the armature 54 are in their integrated states, and the left output shaft $29_L$, the clutch inner 37, the clutch piston 40, the ball cam mechanism 44 and the coil housing 47 are also in their integrated states. Therefore, the transmission of the power from the clutch drive shaft 23 to the left output shaft $29_L$ has been cut off by slipping of the armature 54 relative to the coil housing 47.

When the coil 52 of the solenoid 50 is energized by a command from the electronic control unit U, the armature 54 is attracted to and integrated with the coil housing 47. As a result, the rotation of the clutch drive shaft 23 is transmitted through the clutch outer 36, the armature 54 and the coil housing 47 to the stationary cam member 41 of the ball cam mechanism 44, thereby producing the relative rotations shown by arrows A and B in FIG. 6 between the stationary cam member 41, now integrated with the clutch drive shaft 23, and the movable cam member 42 integrated with the output shaft $29_L$. When the stationary cam member 41 and the movable cam member 42 have been rotated relative to each other, the movable cam member 42 is moved rightwards away from the stationary cam member 41 against a biasing force of the spring 46 by a reaction force received by the cam grooves $41_1$ and $42_1$ from the balls 43, and pushes the clutch piston 40 rightwards to bring the clutch disks 38 and the clutch plates 39 into engagement with each other.

Thus, the clutch outer 36 is coupled directly to the clutch inner 37 through the clutch disks 38 and the clutch plates 39, and the left electromagnetic clutch $C_L$ is brought into the engaged state, thereby permitting the rotation of the clutch drive shaft 23 to be transmitted to the left output shaft $29_L$. When the left and right electromagnetic clutches $C_L$ and $C_R$ have been brought into the engaged states, the left and right rear wheels $W_{RL}$ and $W_{RR}$ are driven. In this manner, the vehicle V is brought into the four-wheel drive state.

The rear differential $D_R$ is capable of generating a difference between the engagement forces of the left and right electromagnetic clutches $C_L$ and $C_R$ by controlling a value of electric current supplied to the coils 52 of the left and right solenoids 50, so that any torques are distributed to the left and right rear wheels $W_{RL}$ and $W_{RR}$, thereby controlling the steering characteristic of the vehicle. A reference yaw rate is calculated based on a steering angle detected by the steering angle sensor $S_3$, a vehicle speed calculated based on outputs from the front wheel speed sensor $S_1$ and the rear wheel speed sensors $S_2$, and a lateral acceleration detected by the lateral acceleration sensor $S_5$, for example, during turning of the vehicle V. This reference yaw rate is compared with an actual yaw rate detected by the yaw rate sensor $S_4$. If the vehicle is in an over-steering tendency or an under-steering tendency as a result of the comparison, a control for eliminating the over-steering tendency or the under-steering tendency can be performed.

Specifically, when the vehicle is in the over-steering tendency, a yaw moment causing the vehicle body to be turned outwards as viewed during the turning of the vehicle can be generated to eliminate the over-steering tendency by increasing the engagement force of the electromagnetic clutch $C_L$ or $C_R$ that is on the inner side during turning of the vehicle, and decreasing the engagement force of the electromagnetic clutch $C_L$ or $C_R$ that is on the outer side during turning of the vehicle. When the vehicle is in the under-steering tendency, a yaw moment causing the vehicle body to be turned inwards during turning of the vehicle can be generated to eliminate the under-steering tendency by decreasing the engagement force of the electromagnetic clutch $C_L$ or $C_R$ that is on the inner side during turning of the vehicle, and increasing the engagement force of the electromagnetic clutch $C_L$ or $C_R$ that is on the outer side during turning of the vehicle.

When a driver have operated the differential lock switch $S_6$, the left and right electromagnetic clutch $C_L$ and $C_R$ are brought into the engaged states by the maximum transmitted torque. In this manner, the vehicle V is brought into the four-wheel drive state and a differential-locked state in which the left and right rear wheels $W_{RL}$ and $W_{RR}$ have been integrally coupled to each other, which can contribute to an increase in driving force when the vehicle runs out of a muddy place.

In this way, the four-wheel drive state and the front wheel drive state can be easily switched over from one to another in a simple structure in which the two electromagnetic clutches $C_L$ and $C_R$ are merely provided to the rear differential $D_R$. Moreover, any driving force can be distributed to the left and right rear wheels $W_{RL}$ and $W_{RR}$, and a differential locking mechanism can be provided.

The appropriate magnitude of the maximum transmitted torque transmitted to the rear wheels $W_{RL}$ and $W_{RR}$ through the rear differential $D_R$ is varied depending upon the friction coefficient of a road surface. It is desirable that on a road surface of a smaller friction coefficient, the maximum transmitted torque is decreased, and on a road surface of a larger friction coefficient, the maximum transmitted torque is increased. If the maximum transmitted torque is set according to the following expression:

$$\text{weight of rear wheel axle} \times \text{friction coefficient of road surface} \times \text{radius of tire}$$

a maximum transmitted torque suitable for the friction coefficient of a road surface can be obtained.

If the maximum transmitted torque is set at a larger value such that it is suited for a road surface of a higher friction coefficient such as an asphalted road, the required capacity of the electromagnetic clutches $C_L$ and $C_R$ is increased, whereby the size of the electromagnetic clutches $C_L$ and $C_R$ is increased. However, a maximum transmitted torque suitable for any of various road surfaces of different friction coefficients can be obtained by limiting the engagement forces of the electromagnetic clutches $C_L$ and $C_R$ on a road surface of a lower friction coefficient such as a snow-laden road. If the maximum transmitted torque is set at a smaller value such that it is suited for a road surface of a lower friction coefficient, the size of the electromagnetic clutches $C_L$ and $C_R$ can be reduced and in its turn, the size of the rear differential $D_R$ can be reduced, but on a road surface of a higher friction coefficient, the maximum transmitted torque may be insufficient in some cases.

Figure 10:
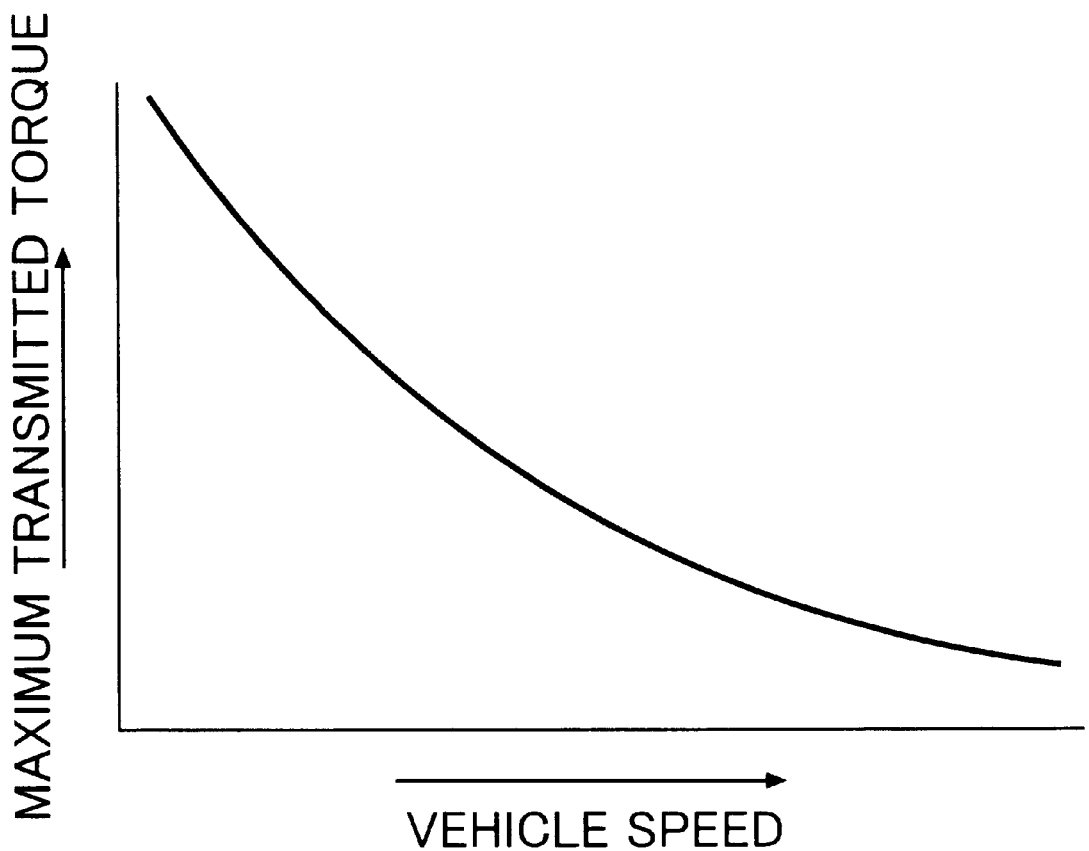

By setting the maximum transmitted torque transmitted to the rear wheels $W_{RL}$ and $W_{RR}$ through the rear differential $D_R$, so that the maximum transmitted torque assumes a maximum value when the vehicle speed is lower, and the maximum transmitted torque is decreased with an increase in vehicle speed, as shown in FIG. 10, the sizes of the electromagnetic clutches $C_L$ and $C_R$, the driver bevel gear 26, and the follower bevel gear 25 can be reduced, and the durability thereof can be enhanced. Namely, the horsepower of the engine E transmitted to the rear wheels $W_{RL}$ and $W_{RR}$ through the rear differential $D_R$ is proportional to the product of the maximum transmitted torque and the vehicle speed. However, if the maximum transmitted torque is decreased with the increase in vehicle speed, it is possible to prevent the horsepower transmitted to the rear wheels $W_{RL}$ and $W_{RR}$ from being increased in accordance with the increase in vehicle speed. Thus, even if the sizes of the electromagnetic clutches $C_L$ and $C_R$, the driving bevel gear 26 and the follower bevel gear 25 are reduced, it is possible to prevent the reduction in durability which may result from transmission of a larger horsepower at higher vehicle speeds.

Now, when the clutch drive shaft 23 of the rear differential $D_R$ is rotated, the inner rotor 67 and the outer rotor 66 of the oil pump 61 accommodated in the front and rear center casings 11 and 12 are rotated, thereby causing the oil stored in the front and rear center casings 11 and 12 to be drawn from the oil strainer 70 via the oil passage 69 into the intake port 68 and supplied from the discharge port 71 via the oil bore $23_1$ into the oil passage $23_2$ defined in the clutch drive shaft 23. The oil flowing from the oil passage $23_2$ in the clutch drive shaft 23 into the oil passages $29_1$ in the left and right output shafts $29_L$ and $29_R$ flows through the oil bores $29_2$ and $29_3$ extending radially from the oil passages $29_1$ to the outside of the clutch drive shaft 23. A portion of this oil is passed through the oil bores $37_1$ defined in the clutch inner 37 to lubricate the clutch disks 38 and the clutch plates 39, and another portion of the oil lubricates the ball bearings 27, the needle bearings 28, the ball cam mechanisms 44, the thrust bearings 45 and the like. The oil after completion of the lubrication is returned from the left and right side casings $13_L$ and $13_R$ through the through-bores $11_1$ and $12_1$ into the front and rear center casings 11 and 12.

Since the oil pump 61 is disposed at the location in which it is sandwiched between the left and right electromagnetic clutches $C_L$ and $C_R$, as described above, the length of the oil passages for supplying the oil from the oil pump 61 to the electromagnetic clutches $C_L$ and $C_R$ can be minimized. Moreover, the oil passages $23_2$ and $29_1$ are defined to extend through the insides of the clutch drive shaft 23 and the left and right output shafts $29_L$ and $29_R$ which are connected in series, a special piping is not required, but also the resistance to flowing of the oil can be decreased.

If the driving bevel gear 26 and the follower bevel gear 25 are disposed within the front and rear center casings 11 and 12, a dead space with two ways surrounded by the bevel gears 25 and 26 is created, but the increase in size of the front and rear center casings 11 and 12 can be prevented by disposing the oil pump 61 utilizing such dead space. Particularly, since the oil pump 61 is comprised of the trochoid pump, with the inner rotor 67 thereof being fixed to the clutch drive shaft 23, the layout of the oil pump 61 in the dead space is facilitated. Moreover, the oil passage 69 connected to the intake port 68 of the oil pump 61 opens directly into the bottoms of the front and rear center casings 11 and 12 and hence, it is possible to effectively prevent the inclusion of air during inclination of the vehicle V. Further, the follower bevel gear 25 and the oil pump 61 disposed in the internal space in the front and rear center casings 11 and 12 exhibit a function of a baffle plate and hence, it is possible to inhibit the rippling of the oil surface to further effectively prevent the inclusion of air.

Since the casing means of the rear differential $D_R$ is divided into the four portions: the front center casing 11, the rear center casing 12 and the left and right side casings $13_L$ and $13_R$, the check and regulation of the meshed states of the driven bevel gear 26 and the follower bevel gear 25 assembled in the front and rear center casings 11 and 12 can be easily carried out by removing the left and right side casings $13_L$ and $13_R$ and separating the rear center casing 12 from the front center casing 11. Moreover, the maintenance of the electromagnetic clutches $C_L$ and $C_R$ assembled within the left and right side casings $13_L$ and $13_R$ can be carried out by only removing the left and right side casings $13_L$ and $13_R$. Further, the structure of a mold used for producing the casing means in a casting process can be simplified, as compared with a case where a casing means is divided into two portions.

Although the embodiment of the present invention has been described in detail, it will be understood that the present invention is not limited to the above-described embodiment, and various modifications may be made without departing from the spirit and scope of the invention defined in claims.

For example, in place of the ball cam mechanism 44 in the embodiment, a cam mechanism of another type can be employed.

What is claimed is:

1. An electromagnetic clutch comprising:

an input member carried on a clutch input shaft, an output member carried on a clutch output shaft, a plurality of friction-engaging elements disposed between said input member and said output member, a clutch piston adapted to bring said friction-engaging elements into close contact with one another to integrally couple said input member and said output member, a solenoid for generating an attracting force by supplying an electric current including an annular coil, an annular coil housing having an outer member, an inner member and an end face member, said outer member covering a radially facing outer peripheral surface of said coil member, said inner member covering a radially facing inner peripheral surface of said coil member, said end face member covering a first axially facing end face of said coil member, and an armature adapted to be attracted to said first axially facing end face of said coil member when electric current is supplied to said coil member, wherein said inner and outer members of said annular coil housing protrude past a second axially facing end face of said coil member.

2. An electromagnetic clutch according to claim 1, further comprising a cam mechanism disposed between the clutch output shaft and the solenoid to have a gap between said cam mechanism and said clutch output shaft and a gap between said cam mechanism and said solenoid.

3. An electromagnetic clutch according to claim 1, further comprising a core about which the coil is disposed, wherein each of said core, said coil housing and said armature is formed of a material having a high relative magnetic permeability.

* * * * *